Sept. 30, 1958 J. H. CRANKSHAW 2,853,860
COUPLING WITH END PLAY DEVICE
Filed June 14, 1954

INVENTOR.
JOHN H. CRANKSHAW
BY
Charles L. Lovercheck
ATTORNEY

United States Patent Office 2,853,860
Patented Sept. 30, 1958

2,853,860
COUPLING WITH END PLAY DEVICE

John H. Crankshaw, Erie, Pa., assignor to American Flexible Coupling Company, Erie, Pa., a corporation of Pennsylvania Application June 14, 1954, Serial No. 436,515

2 Claims. (Cl. 64—9)

This invention relates to couplings and more particularly to couplings generally known as gear couplings wherein a flexible connection is required between two shafts.

In gear couplings made according to previous designs and with which I am familiar, no practical means was provided to prevent end play and transmit thrust between the relatively rotating shafts. Where the shafts are allowed to run with their ends in contact with each other or with a rigid material therebetween, the effect of impact and wear on the shafts is quite appreciable.

It is, accordingly, an object of the invention to provide a gear type coupling having a device to reduce end play between the coupled shafts in combination therewith and transmit thrust as necessary.

Another object of the invention is to provide a novel type of end play device wherein resilient material is deflected upon a misalignment of the shafts and wherein the resilient material is put in compression and/or shear to reduced end play and absorb thrust.

Another object of the invention is to provide an end play and thrust device comprising roller members disposed around the periphery thereof which restrain the two shafts against relative axial movement.

Another object of the invention is to provide a device for reducing the end play and for transmitting thrust between two intersecting shafts by providing a ball and socket type joint having a dissimilar metal disposed between.

A further object of my invention is to provide a novel seal engaging contour on a member in a coupling.

A further object of the invention is to provide a gear type coupling which will be simple in construction, economical to manufacture, and efficient in use.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

In the drawing:

Fig. 1 is a view of the novel coupling having certain parts shown in cross section for better illustration;

Figures 2, 3:
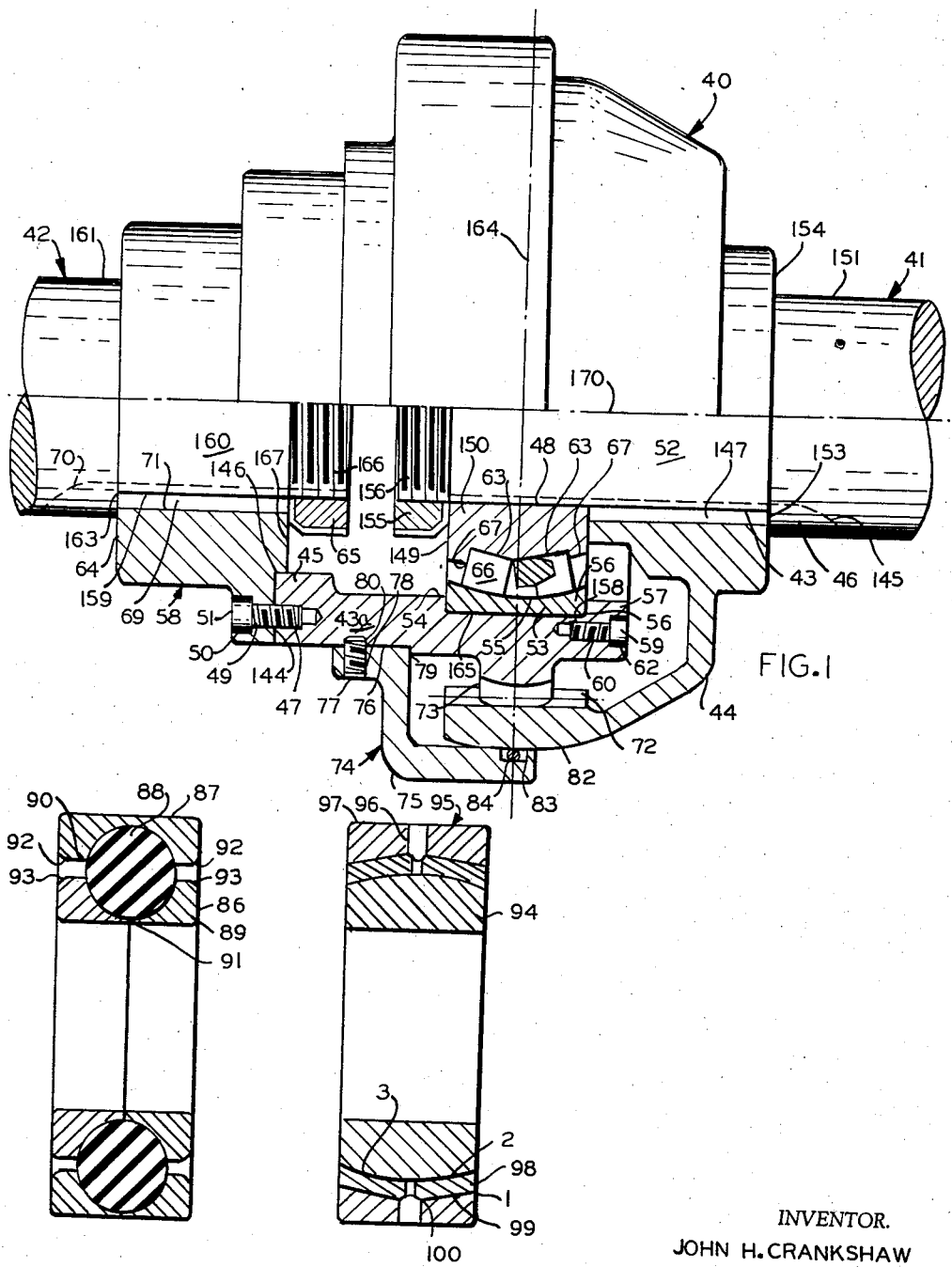
Fig. 2 is a cross sectional view of another embodiment of an end play and thrust device for use in my coupling shown in Fig. 1.
Fig. 3 is a cross sectional view of still another embodiment of my end play device for use in the coupling shown in Fig. 1.

Now with more specific reference to the drawing, in Fig. 1, I show a gear coupling 40 connecting shafts 41 and 42 which must run in slightly misaligned relation. The shaft 41 is inserted in bore 43 in housing 44 and has a key slot 145 therein which receives a key 46. The key 46 engages a similar keyway 147 in housing. The shaft 41 further extends through the bore 48 in the roller member 149 of an end play device 150. The shaft 41 has an enlarged portion 151 which is integrally connected to the reduced size portion 52 and has a shoulder 153 which engages the end 154 of the housing member. A nut 155 engages the threaded end 156 of the reduced size portion 52 and forces the inner member 150 into contact with the shoulder 167 of the housing member, thereby holding it in rigid relationship thereto.

The outer housing member 58 has a bore 159 which engages the reduced size end 160 of the shaft 42. The enlarged size end 161 of the shaft 42 is integral with the reduced size portion 160 and terminates in a shoulder 63 which engages the end 64 of the housing member. A nut 65 threadably engages the threaded end 166 of the shaft and engages the surface 167 of the outer housing member 58 to force it into engagement with the shoulder 163. A key 69 is fitted into a keyway 70 in the shaft 42 and engages a similar keyway 71 in the outer housing member.

The outer tooth carrying member 43a has an end surface 144 which engages the end 45 of the shaft engaging member 58. The shaft engaging member has a stepped portion 146 which holds the tooth carrying member 43a in alignment. The outer tooth carrying member 43a has a threaded hole 47 which receives the bolt 49 and the hole 47 is countersunk at 50 to receive the head 51 of the bolt. Similar bolts are spaced around the periphery of the housing 58 to hold it in rigid relation to the outer tooth supporting member 43a.

The outer tooth member 43a has a counterbore 165 therethrough which terminates in a shoulder 54 and the outer member 55 of the end play device engages the surface 56 of the tooth supporting member and is forced against the shoulder 54 by means of the collar 57 which has a reduced size portion 158 that extends into and engages the surface 56 of the tooth carrying member 43a and forces the outer end play member 55 into engagement with the shoulder 54. The collar 57 is held in rigid relation against the outer end play member 55 by means of the bolts 59 which threadably engage holes 60 in the tooth supporting member and a counterbore 61 accommodates the head 62 of the bolts. Similar bolts are spaced around the periphery of the collar 57.

The inner member 149 of the thrust member has peripheral grooves 63 which extend outwardly from the center line 164 of the tooth 73 and are shaped to conform to the peripheral surface 53 of the roller members 66. The grooves 63 terminate in the roller engaging surfaces 67. The outer member 55 of the end play device has surfaces 53 formed on the arc of a circle having its center on the corner of the intersection of the center line 170 of the shaft 41 with center line 164. The roller members 66 will preferably be made of a dissimilar metal to the material of the end play members 55 and 150. Internal teeth 72 are supported on the member 44 and the external teeth 73 are supported on the tooth carrying member 43a. A grease retainer 74 is made up of the bracket member 75 which engages the external tooth supporting member 43a at 76 and is held thereto by the set screws 77 which engage threaded holes 78 in the member 75. The member 74 is bored to slide over the member 43a and abuts against the shoulder 79. The set screws engage the threaded holes in the grease retainer member 74 and indentations 80 in the end play device.

The internal tooth supporting member 44 has an external surface having a radius 82 which is in the form of a portion of a sphere having its center at the intersection of the center line of the teeth and the center line of the shaft 41. The grease retainer 74 has a groove 83 therein wherein the O-shaped washer 84 is supported.

When the two shafts are rotated in misaligned condition, the O-shaped washer slides along surface 82 without change in deformation along the surface 82.

In Fig. 2, I show another embodiment of my invention wherein the inner member 86 would normally replace the inner member 150 on the shaft 41 and the outer member 87 would normally replace the outer member 55 in Fig. 1. The resilient member 88 replaces the roller members 66 of the embodiment shown in Fig. 1. The two halves 89 and 90 of the inner member 86 are preferably joined together at 91 for easy assembly and the ends 92 and 93 are spaced comparatively close together in order that resilient material 88 can be extruded therethrough. It will be seen that when the two shafts are misaligned and rotated, the rubber is deformed; however, if the two shafts 41 and 42 have a tendency to move axially relative to each other, the rubber is put in compression and, therefore, the end play is opposed.

Fig. 3 shows another embodiment of the end play restricting device wherein the inner member 94 is adapted to fit on the end of the shaft 41 to replace the inner member 150. The outer member 95 which is made up of the two members 96 and 97 is adapted to replace the outer member 55 on the tooth carrying member 43a. The inner member 94 and outer member 95 will preferably be made of a dissimilar metal to the insert 98. The inner peripheral surface 99 of the outer member 96 is larger at the center end 100 than at the outer end 1 to keep the insert 98 from sliding outward and the outer surface 2 of the inner member 94 is of the form of the section of the periphery of a sphere having its center at the center point 3. The inner member 94 slides on the surface 2 of the insert member when the two shafts are operated in misaligned position but end play between the shafts is opposed.

In the foregoing specification, I have set forth the invention in its preferred practical forms but I am aware that the structure shown is capable of modification with a range of equivalents without departing from the invention which is to be understood is broadly novel as is commensurate with the appended claims.

The embodiments of the invention in which an exclusive property or privilege is claimed are defined as follows:

1. A coupling for shafts comprising a first coupling member, a second coupling member, a first shaft attached to said first coupling member and a second shaft attached to said second coupling member, an end play member attached to said first shaft and another end play member attached to said second coupling member, one said end play member having a peripheral groove receiving elongated roller bearing members with their axes intersecting, said second end play member having an internal peripheral spherical shaped surface, roller members engaging said grooves and said spherical shaped surface, spherical shaped gear teeth on said second coupling member and extending radially outwardly therefrom and overlying said roller members, a housing on said first coupling member overlying said teeth and having an outer spherical shaped surface, said housing having internal teeth thereon, said internal teeth engaging said teeth on said second coupling member whereby torque is transmitted from said first shaft to said second shaft and said first shaft and said second shaft may operate in misalignment with each other, and a grease retaining member attached to the outer periphery of said second coupling member having a flange thereon overlying said housing on said first coupling member, said flange on said grease retaining member having a groove on the inner periphery thereof, said groove having an O-shaped washer therein, said washer forming sealing engagement with the outer peripheral surface of said first coupling member.

2. A coupling for two shafts comprising a first and a second spaced, generally aligned shaft, each said shaft having the end thereof adjacent the other said shaft of reduced diameter with a shoulder adjacent the end thereof, a first coupling member having a bore therein receiving said reduced size end of said first shaft, an end play device having an outer portion and an inner portion inside said outer portion and spaced therefrom, a bore receiving said reduced size end of said first shaft outward of said first coupling member, a nut threadably received on the outer end of said first shaft clamping said end play device and said coupling member on said first shaft between said nut and said shoulder, said second shaft having a reduced size end, said second shaft end being threaded and terminating at a shoulder spaced from said threads, a nut on said threaded end clamping said second coupling member on said second shaft, said second coupling member having a tooth carrying member extending toward said first shaft and overlying said second shaft nut and said end play device, means to clamp an outer portion of said end play device in the inner periphery of said tooth carrying member, the outer portion of said end play device having a surface shaped to conform to the outer surface of a sphere, the outer surface of the inner part of said end play device having two peripheral grooves, a first and a second set of elongated roller members in said grooves, said first set of roller members having their axes inclined to the axes of said other set, said inner surface of said outer part of said end play device engaging said roller members, external spherical shaped teeth on said second coupling member, internal teeth on said first coupling member meshing with said second coupling member teeth, and a grease retaining member overlying said first coupling member and making sealing engagement therewith.

References Cited in the file of this patent

UNITED STATES PATENTS

| 1,582,424 | O'Neil | Apr. 27, 1926 |
| 1,995,408 | Wallgren | Mar. 26, 1935 |
| 2,286,862 | Livingston | June 16, 1942 |
| 2,565,558 | Highberg | Aug. 28, 1951 |

FOREIGN PATENTS

| 759,920 | France | Dec. 6, 1933 |